US 009589533B2

(12) United States Patent
Banski et al.

(10) Patent No.: US 9,589,533 B2
(45) Date of Patent: Mar. 7, 2017

(54) MOBILE ELECTRONIC DEVICE INTEGRATION WITH IN-VEHICLE INFORMATION SYSTEMS

(71) Applicant: Robert Bosch GmbH, Stuttgart (DE)

(72) Inventors: Holger Banski, Santa Clara, CA (US); Jens Faenger, Santa Clara, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/771,134

(22) PCT Filed: Feb. 28, 2014

(86) PCT No.: PCT/US2014/019424
§ 371 (c)(1),
(2) Date: Aug. 27, 2015

(87) PCT Pub. No.: WO2014/134452
PCT Pub. Date: Sep. 4, 2014

(65) Prior Publication Data
US 2016/0012795 A1    Jan. 14, 2016

Related U.S. Application Data

(60) Provisional application No. 61/770,736, filed on Feb. 28, 2013.

(51) Int. Cl.
*G09G 5/00* (2006.01)
*G09G 5/395* (2006.01)
(Continued)

(52) U.S. Cl.
CPC ........... *G09G 5/006* (2013.01); *G01C 21/265* (2013.01); *G01C 21/362* (2013.01); *G06F 3/14* (2013.01);
(Continued)

(58) Field of Classification Search
None
See application file for complete search history.

(56) References Cited

U.S. PATENT DOCUMENTS 5,857,109 A     1/1999  Taylor
6,747,991 B1 *  6/2004  Hemy ............. H04N 21/23418
                                                    370/236

(Continued)

FOREIGN PATENT DOCUMENTS

EP         2111049 A2    10/2009

OTHER PUBLICATIONS

Lamberti, Fabrizio et al., "An Accelerated Remote Graphics Architecture for PDAs" (2003). (7 pages).

(Continued)

*Primary Examiner* — Ke Xiao
*Assistant Examiner* — Jed-Justin Imperial
(74) *Attorney, Agent, or Firm* — Maginot Moore & Beck LLP (57) ABSTRACT

A system displays graphics with an in-vehicle information system and a mobile electronic device. The in-vehicle information system receives encoded graphics data from the mobile electronic device and displays the encoded data with a graphical output device. The mobile electronic device executes program instructions to generate a series of graphics frames that are generated at a first frame rate and stored in an off-screen frame buffer in the mobile electronic device, generate encoded data corresponding to the series of graphics frames, and transmit the encoded data to the in-vehicle information system.

9 Claims, 4 Drawing Sheets

(51) Int. Cl.

| | | |
|---|---|---|
| *G01C 21/26* | (2006.01) | |
| *G01C 21/36* | (2006.01) | |
| *G06F 3/14* | (2006.01) | |
| *G06T 1/60* | (2006.01) | |
| *G06T 3/40* | (2006.01) | |
| *H04W 4/04* | (2009.01) | |

(52) U.S. Cl.
CPC .............. *G06F 3/1423* (2013.01); *G06T 1/60* (2013.01); *G06T 3/4092* (2013.01); *G09G 5/395* (2013.01); *H04W 4/046* (2013.01); *G06F 3/1454* (2013.01); *G09G 2310/08* (2013.01); *G09G 2340/02* (2013.01); *G09G 2340/0407* (2013.01); *G09G 2350/00* (2013.01); *G09G 2380/10* (2013.01)

(56) References Cited

U.S. PATENT DOCUMENTS

| | | |
|---|---|---|
| 7,274,368 B1 | 9/2007 | Keslin |
| 7,281,213 B2 | 10/2007 | Callegari |
| 7,535,484 B2 | 5/2009 | Lessing et al. |
| 7,630,612 B2 | 12/2009 | Kent, Jr. et al. |
| 7,659,907 B1 | 2/2010 | Chalfin et al. |
| 7,692,682 B2 | 4/2010 | Pun et al. |
| 7,898,599 B2 | 3/2011 | Lippman |
| 8,018,955 B2 | 9/2011 | Agarwal et al. |
| 8,085,855 B2 | 12/2011 | Bennett |
| 8,259,735 B2 | 9/2012 | Gutman et al. |
| 8,315,315 B2 | 11/2012 | Amonou et al. |
| 8,392,595 B2 | 3/2013 | Babonneau et al. |
| 8,494,439 B2 | 7/2013 | Faenger |
| 8,572,162 B2 | 10/2013 | Gokaraju et al. |
| 2005/0058197 A1 | 3/2005 | Lu et al. |
| 2007/0016594 A1 | 1/2007 | Visharam et al. |
| 2008/0042923 A1* | 2/2008 | De Laet ................ G05B 15/02 345/1.3 |
| 2008/0049030 A1 | 2/2008 | Keslin |
| 2009/0089453 A1 | 4/2009 | Bohan et al. |
| 2009/0189890 A1 | 7/2009 | Corbett et al. |
| 2010/0150224 A1 | 6/2010 | Pateux et al. |
| 2011/0140873 A1 | 6/2011 | Stahlin et al. |
| 2011/0153367 A1 | 6/2011 | Amigo et al. |
| 2011/0185390 A1 | 7/2011 | Faenger et al. |
| 2011/0196969 A1 | 8/2011 | Tarte et al. |
| 2011/0234902 A1* | 9/2011 | Shenoi ................ H04J 3/0632 348/515 |
| 2011/0294490 A1* | 12/2011 | Faenger ................ G08C 17/00 455/419 |
| 2012/0072609 A1 | 3/2012 | Rajamani et al. |
| 2012/0095643 A1 | 4/2012 | Bose et al. |
| 2012/0147946 A1* | 6/2012 | Gao ....................... H04N 19/10 375/240.02 |
| 2012/0179325 A1 | 7/2012 | Faenger |
| 2012/0192109 A1 | 7/2012 | Stolle et al. |
| 2012/0256842 A1 | 10/2012 | Kalu |
| 2013/0103236 A1 | 4/2013 | Mehrgan |
| 2013/0141331 A1* | 6/2013 | Shiu ....................... G09G 5/003 345/158 |
| 2013/0300554 A1 | 11/2013 | Braden |

OTHER PUBLICATIONS

"Best Practices for Multi-Device Transcoding," Knowledge Center, Kaltura Open Source Video, available at "http://cdnknowledge.kaltura.com," available as early as Feb. 13, 2014 (19 pages).

Shinder, Deb, "Connect Your Smart Phone to Your Desktop Via Software or Web Service," Smartphones, Dec. 17, 2010 (4 pages).

Packard, Keith et al., "The Damage Extension Protocol Version 1.1," Open Source Technology Center, Intel Corporation, Jan. 8, 2007 (4 pages).

Brown, Michael et al., "OpenGL Vizserver 3.1 Application Transparent Remote Interactive Visualization and Collaboration," available as early as Feb. 13, 2014 (16 pages).

Vaughan-Nichols, Steven J., "Red Hat's Future Linux Desktop," Apr. 11, 2011 (10 pages).

Red Hat Global Resource Library, "SPICE: Simple Protocol for Independent Computing Environments," available as early as Feb. 13, 2014 (1 page).

Red Hat, Inc., "Spice Remote Computing Protocol Definition v1.0," 2009 (45 pages).

The VirtualGL Project, "A Study of the Performance of VirtualGL 2.1 and TurboVNC 0.4," Aug. 20, 2008 (34 pages).

The VirtualGL Project, "User's Guide for VirtualGL 2.1.1 and TurboVNC 0.5," available at: http://www.virtualgl.org/vgldoc/2_1_1, available as early as Feb. 13, 2014 (48 pages).

The VirtualGL Project, "VirtualGL/TurboVNC Survey Reults," Mar. 17, 2008 (13 pages).

International Search Report corresponding to PCT Application No. PCT/US2014/019424, mailed Jul. 24, 2014 (4 pages).

* cited by examiner

MOBILE ELECTRONIC DEVICE INTEGRATION WITH IN-VEHICLE INFORMATION SYSTEMS

CLAIM OF PRIORITY

This application is a 35 U.S.C. §371 National Stage Application of PCT/US2014/019424, filed on Feb. 28, 2014, which claims the benefit of priority to U.S. Provisional Application No. 61/770,736, filed on Feb. 28, 2013, the disclosures of which are incorporated herein by reference in their entirety.

FIELD

This disclosure relates generally to the field of in-vehicle information systems and, more specifically, to systems and methods that enable a mobile electronic device to complement an in-vehicle information system.

BACKGROUND

Modern motor vehicles often include one or more in-vehicle information systems that provide a wide variety of information and entertainment options to occupants in the vehicle. Common services that are provided by the in-vehicle information systems include, but are not limited to, vehicle state and diagnostic information, navigation applications, hands-free telephony, radio and music playback, and traffic condition alerts. In-vehicle information systems often include multiple input and output devices. For example, traditional buttons and control knobs that are used to operate radios and audio systems are commonly used in vehicle information systems. More recent forms of vehicle input include touchscreen input devices that combine input and display into a single screen, as well as voice-activated functions where the in-vehicle information system responds to voice commands. Examples of output systems include mechanical instrument gauges, output display panels, such as liquid crystal display (LCD) panels, and audio output devices that produce synthesized speech.

The benefit of replicating applications in the driver information system is that the applications can be specifically adapted to the car environment. For example, functionality can be reduced or limited, or the user interface of the application can be changed to be specifically targeted to the input controllers in the car. Applications in the mobile phone are not designed with use in the car in mind. Thus, such applications do not consider that the driver has to divert his attention from the driving task when operating the applications on the phone.

Nokia's remote control described in WO-2006067541 A1 is a phone remote control designed for the car environment. Nokia's in-vehicle information system is tightly integrated with a limited amount of functions of the phone. Only applications that were specifically designed with this technology in mind are able to make use of the remote controller functionality. Nokia's in-vehicle information system does not teach how to control an unlimited number of third party applications running on the phone or phones that were not built with this extension in mind.

State of the art technologies such as X Windows, Remote Desktop Protocol, and Virtual Network Computing make it possible to transmit the display content of one computer to another and enable remote control of any application that is running on the display-transmitting computer. A solution based on the same technology but specifically targeted towards mobile phones is Celio Technology Corporation's Redfly. Redfly transmits the phone's screen content to a portable terminal includes an external screen, keyboard and touchpad. In addition, the Redfly system increases the screen resolution of the phone to match the resolution of the external display. This enables phone applications to display more content on the external screen. All of the above-mentioned solutions transmit just the unmodified screen content to the screen of another device. Apart from a simple scaling or rotation operation, no content adjustment is performed. Advanced operations such as rearranging the screen or application layout or even filtering content to support a driver are not performed. Furthermore, none of the existing technologies teach how to integrate output from applications of the remote controlled computer to match the graphical representation of applications running on the controlling computer. In addition, user input on the controlling computer is simply sent back to the remote controlled device, and thus a simple 1:1 mapping is applied. That means compatible input devices, such as a mouse, must exist on both the remote controlled computer and the controlling computer.

State of the art technologies such as Johnson Controls' Bluetooth Mobile Device Gateway make it possible to transmit sensor information from the car to a portable navigation system which is connected using Bluetooth or USB. The portable navigation system processes the information and displays output on its own screen and loudspeaker. This technology is not intended for making the portable navigation system a "computing resource" for the car, as the results of the processing stays within the portable navigation system. Especially, the portable navigation is not intended to complement functionality offered by a driver information system available in the car. As an example, both the driver information system in the car and the portable navigation system have the ability to display a navigation map. There is no option of sharing the rendered map between the driver information system and the portable navigation system.

While existing systems enable some limited interaction between mobile electronic devices and in-vehicle information systems, the in-vehicle information systems are typically limited to providing a fixed set of functions and services that are implemented at the time of manufacture of the vehicle. For example, many in-vehicle information systems do not receive hardware and software upgrades during the life of the vehicle, and many vehicles have operating lifetimes of many years. Due to the physical implementation of the hardware and software components of an in-vehicle information system, traditional upgrades to these systems can be difficult to perform in an efficient manner. Consequently, improvements to the in-vehicle information systems that extend the functionality of the services provided to occupants in the vehicle while not requiring extensive modifications to the hardware and software in the vehicle would be beneficial.

SUMMARY

In the embodiments described herein, a mobile electronic device, such as a smartphone, tablet computer, or notebook computer, extends the functionality of an in-vehicle information system that is integrated with a motor vehicle. The system adds functionality to enable the mobile phone to display output using the output devices that are part of the in-vehicle information system. The system also enables a user to provide input with the devices built into the vehicle for operation of the mobile electronic device. Both input and output operations modify the contents of information that are displayed to the user in order to translate between the different capabilities of the mobile electronic device and the driver information system. The system supports the driver in using the mobile electronic device while driving and to minimize the potential distraction of using the mobile electronic device.

In addition, the in-vehicle information system enables one or more display devices in the driver information system to receive display data from the mobile phone for extensive computation or rendering of graphics. The display of data through the in-vehicle information system display devices is especially beneficial in embodiments where the mobile electronic device provides more powerful computing and graphics performance than the driver information system that is integrated with the vehicle. The in-vehicle information system uses the results of those computations that are performed by the mobile electronic device. In one configuration, the mobile electronic device performs computationally expensive operations to generate graphical content that is then displayed using an in-vehicle display device such as an LCD screen. The graphical data are transmitted from the mobile electronic device to the in-vehicle information system using a wireless networking device, and the embodiments described herein including efficient methods for streaming graphical information to an in-vehicle information system in bandwidth-constrained configurations.

In one embodiment, a system for the display of graphics includes an in-vehicle information system and a mobile electronic device. The in-vehicle information system includes a first display device, a first network interface device, and a first processor operatively connected to the first display device and the network interface device. The first processor is configured to receive encoded graphics data corresponding to a series of graphics frames generated by a mobile electronic device through the first network interface device and decode the encoded graphics data to generate a display of the graphics frames using the first display device. The mobile electronic device includes a second network interface device, a memory, and a second processor operatively connected to the second network interface device and the memory. The second processor is configured to execute program instructions to generate a series of graphics frames that are generated at a first frame rate and stored in an off-screen frame buffer in the memory, generate encoded data corresponding to the series of graphics frames, and transmit the encoded data to the in-vehicle information system using the second network interface.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "mobile electronic device" refers to any portable computing device that includes a processor, memory, wired or wireless networking devices, and graphical output devices. Examples of mobile electronic devices include, but are not limited to, portable PCs, smartphones, tablets, and wearable computing devices.

Figure 1:
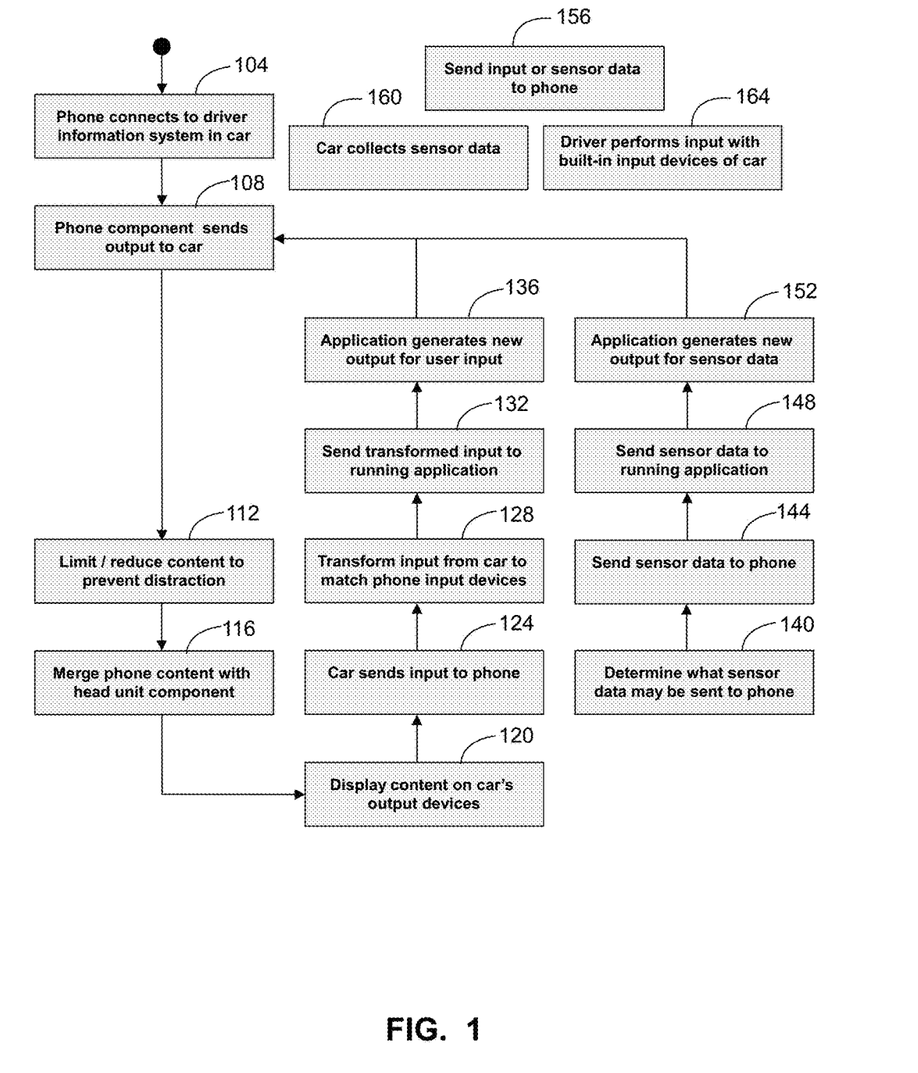
FIG. 1 is a block diagram of a process for integration of a mobile electronic device, such as a mobile phone, with an in-vehicle information system in a motor vehicle.
Figure 2:
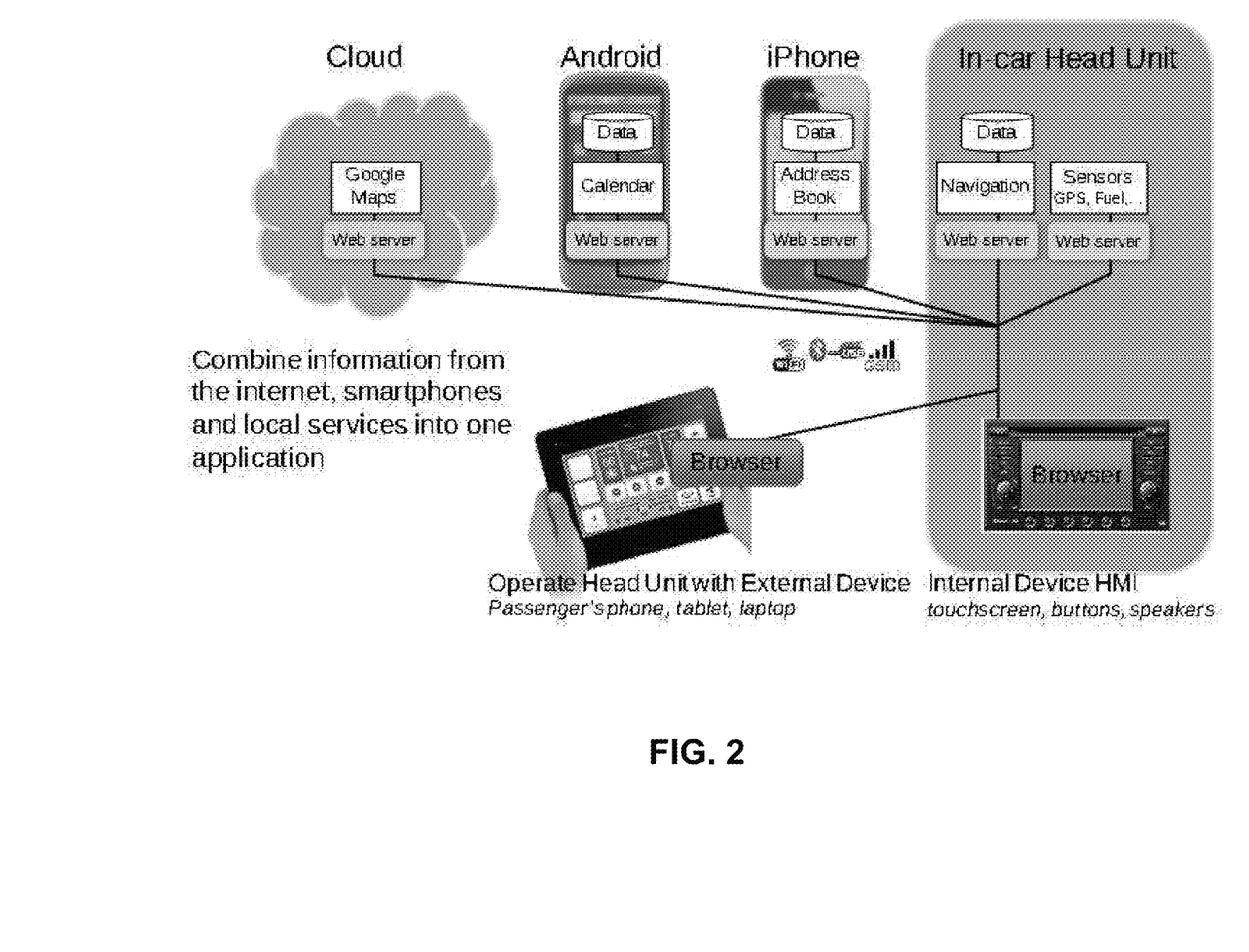
FIG. 2 is a depiction of smartphones that are configured to interact with an in-vehicle information system.

FIG. 1 depicts a block diagram of an interaction process between components in an in-vehicle information system and a mobile electronic device, such as a mobile phone in the embodiment of FIG. 1. In FIG. 1, the mobile phone connects to the information system in the vehicle, which is a car in the embodiment of FIG. 1 (block 104). In one embodiment, the mobile phone establishes a wireless connection using, for example, the Bluetooth or 802.11 (WiFi) families of wireless protocols. In another embodiment, the mobile phone connects to the in-vehicle information system using a wired connection such as a universal serial bus (USB) connection. FIG. 2 depicts illustrative embodiments of mobile electronic devices that interface with an in-car head unit of an in-vehicle information system.

Referring again to FIG. 1, during operation, the mobile phone sends output to the in-vehicle information system (block 108). The information includes, for example, video output data, audio output data, and data from one or more sensors such as navigation sensors (e.g. GPS), and data that are retrieved from computers through wireless data networks that the mobile phone accesses using a web browser or other networked software.

After the connection between phone and car has been established the phone starts exchanging data with the driver information system. For this purpose, the in-vehicle information system captures the content that is normally output on the screen, loudspeaker, or on other output devices, such as haptic devices, in the phone. The in-vehicle information system and the mobile phone include one or more hardware and software components to enable the in-vehicle information system to receive and display output from the mobile phone. In one embodiment, the in-vehicle information system captures and records the complete output of the screen and audio output using available physical connectors. For this purpose, the in-vehicle information system use video and audio output connectors of the phone if they are available. In another embodiment, a software application that is installed on the mobile phone redirects the output of the screen and audio output from the mobile phone to the in-vehicle information system. This components periodically read the content of the screen and check for changes. This approach is building up on technologies such as Virtual Network Computing.

In another embodiment, the mobile phone captures and sends instructions corresponding to the rendering of graphics and audio to the in-vehicle information system. This approach includes a component on the phone that is able to record all instructions that generate output on the graphics and audio system of the phone, such as "draw line", "show text", "display dialog window" or "play audio sample". This enables the in-vehicle information system to register every graphics and audio command initiated on the phone. In contrast to the approaches mentioned above this approach does not capture the "result" of e.g. draw operations on the screen but instead the instructions that lead to the results. This approach is building up on technologies such as X Windows and Remote Desktop Protocol. It also adds support for additional output modalities such as vibration and other haptic feedback, where the in-vehicle information system provides the haptic feedback using a haptic feedback device in the vehicle instead of in the mobile phone.

In addition to recording low level instructions to draw on the screen or output sound, the in-vehicle information system also registers calls to higher level phone functions. For example, some phones provide the option of notifying applications about incoming messages, such as email, text messages or phone call. The in-vehicle information system uses such notification options and collects additional usage information from the phone. If an application displays an information or warning dialog accompanied with a sound on the speaker, the in-vehicle information system registers the instruction as well. Another example is recording usage of a text-to-speech system in the phone. This enables the in-vehicle information system to determine and record the text that resulted in an audio output, rather than the audio output itself.

Some phone embodiments lack the software and hardware functionality that enables the phones to output display data to the in-vehicle information system using the embodiments that are described above. In particular, the embodiments described above are often embodied as services that are implemented at the operating system (OS) level in the mobile phone software. The individual software applications include programmed instructions that are executed on the phone do not require additional functionality to have their output redirected to the in-vehicle information system. In phones that lack the OS software to implement the embodiments that are describe above, the individual software applications that are installed on the mobile phone are modified to communicate with the in-vehicle information system in the car. In this case, all the previously explained technology options are integrated into individual applications. This embodiments enables integration between modified versions of existing phone applications to provide specific output to the in-vehicle information system in the car.

Referring again to FIG. 1, for some forms of content, the output from the mobile electronic device is simplified to reduce the distraction to the driver in the car (block 112). For example, animations or other elements that can distract the driver are filtered from the output when the car is in motion. In another configuration, the video and animations are displayed through LCD screens in the car that are within the view of passengers, but not in the view of the driver.

After capturing the output from the phone, the in-vehicle information system analyzes the content of the output and optionally transforms the output to a suitable format for presentation with the output devices in the in-vehicle information system (block 116). In many embodiments, the output devices on a phone often differ from the output devices in the car, and the transformation of the output enables the in-vehicle information system to present the output in a form that is convenient for the vehicle occupants. For example, the physical size of the phone screen is often smaller than an LCD display in the car. In addition, the screen resolution and the aspect ratio often differ between the mobile phone and the displays in the vehicle. The transformation of the content adjusts the output of the phone to correspond to the specific parameters of the output devices in the car. For example, in one configuration the video output resolution and/or aspect ratio of the output from the phone are scaled to correspond to a display in the vehicle. In one embodiment, the driver information system sends the available output devices and operating characteristics for the devices to the phone for transformation of the output in the phone.

In another configuration, the transformation enables integration of the output from the phone with the operating environment in the vehicle. For example, the sizes and colors of text fonts in the output are adjusted to increase the legibility of the text on a display in the in-vehicle information system. The layout of elements displayed are optionally rearranged or elements are removed to emphasize high priority information and deemphasize or remove lower priority information in the output.

The modification of the content in the output can include an analysis of the content. In one embodiment, a processor in the phone or in the in-vehicle information system analyzes graphics and audio instructions that are used to generate the output. The information retrieved from capturing the instructions that generate the output makes it possible to "understand" what e.g. shapes and text are drawn on the screen, what type of audio is output on the phones speaker and how the phone is vibrating. In combination with additional information resulting from capturing higher level phone functions such as usage of text-to-speech or display of dialogs with warnings or notifications, the in-vehicle information system adds meaning to the output that was recorded.

In another embodiment, no graphics and audio instructions are available to reconstruct the content. Instead, the processor in the phone or in the in-vehicle information system performs an Optical Character Recognition (OCR) process to identify text that is present in the output. For non-text graphics, the processor in the in the phone or in the in-vehicle information system performs image analysis to understand what elements and shapes are displayed on the screen. If the output is an audio output, the processor in the phone or in the in-vehicle information system performs voice recognition to convert audio into text and audio analysis to decide what kind of audio is currently playing (music, commercials, speech, type of music, etc.).

In some embodiments, the transformation process includes the addition of structured metadata to the transformed content. Examples of metadata include the names of running applications that generated the output or whether the output on the phone was generated as a direct result of user input (i.e. a user interaction takes place) or if the phone itself initiated the output.

In one embodiment, the in-vehicle information system performs additional transformations on the content of the output to remove items from the display in the vehicle. The removal of some display items reduces distraction for the driver and other occupants in the vehicle. In one embodiment, the in-vehicle information system limits the frequency of content updates from phone. The in-vehicle information system checks how often the phone tries to output information and limits the frequency of updates. This strategy would also prevent output of e.g. video while driving. This strategy can either be realized without direct analysis of the content by assessing the frequency of content transmissions from the phone. In another embodiment, the in-vehicle information system analyzes the content that is to be displayed to identify what is to be displayed and for example enable minor updates to existing content but to prevent major updates.

In another configuration, the in-vehicle information system limits the output to content that is relevant. The in-vehicle information system uses the results of the content analysis to understand what kind of application is trying to output content (email application, games, etc.) and what kind of content is to be output (warning, information, message, entertainment, etc.). The in-vehicle information system uses this rule to only enable driving related applications and content. For example, the in-vehicle information system prevents the driver or other vehicle occupants from playing a game while the vehicle is driving.

In another configuration, the in-vehicle information system temporarily delays the output of content while the vehicle is in motion. The in-vehicle information system stores content with a lower relevance in a memory without displaying the content to reduce driver distraction while the vehicle is in motion. When the in-vehicle information system identifies that the vehicle has come to a stop, then the lower relevance content are displayed using the output devices in the vehicle.

One or more display devices in the car, such as LCD screens or head-up displays (HUDs) present the content to occupants in the vehicle (block 120). In some configurations, an occupant in the car operates a control for the in-vehicle information system (block 164) and the in-vehicle information system generates a message for the mobile phone that corresponds to an input for the phone (block 124). For example, when a passenger in the vehicle presses a button on an in-vehicle console to access music, the in-vehicle information system sends the request for music to the mobile phone, which stores digital music files in an internal data storage device. The in-vehicle information system transforms the input request into a message or command that is compatible with the mobile phone (block 128). The command is transmitted to a software application that includes program instructions that are executed by the processor in the mobile phone (block 132) and the software application in the mobile phone generates an output for display through the in-vehicle information system (block 136). For example, a music application in the mobile phone receives a command to display a list of available songs for playback, and the phone sends the list of songs to the in-vehicle information system for display and selection of songs for playback through speakers in the vehicle.

In another embodiment, the in-vehicle information system includes voice-input functionality, and the mobile electronic device optionally includes voice-input functionality as well. In one embodiment, both the in-vehicle information system and the mobile electronic device receive the voice input. The in-vehicle information system and the mobile electronic device perform the voice-recognition process in parallel to identify voice input with greater accuracy than either system could provide in isolation. In another embodiment, the in-vehicle information system suspends voice input recognition when the mobile electronic device is connected to the in-vehicle information system. In an embodiment where the accuracy of the voice input interface in the mobile electronic device exceeds the quality of the voice input interface in the in-vehicle information system, the voice input interface in the mobile electronic device takes precedence.

After receiving the input from the car, the mobile electronic device, such as the phone in FIG. 1, processes the input. This processing transforms input data that are received from devices in the in-vehicle information system to an input that is compatible with the software applications that are executed on the phone. For example, if the car is using a rotary dial for input but the phone is using a touch screen, the transformation process translates selection of screen elements with the dial into pointing operations on the screen at the position of the element selected. In one embodiment, the transformation process takes into account the previous transformation of phone output to correspond to the in-vehicle output devices. The occupants in the vehicle provide an input in response to content that is displayed on output devices in the vehicle. Since the output might have been transformed in the output transformation process explained above (elements are adjusted in size, layout is rearranged, elements are removed, etc.), the transformation of the input has to compensate for that transformation in order to make correct input into the phone.

The phone optionally displays and output in response to receiving the input from the in-vehicle information system. In another configuration, the phone generates the output and the in-vehicle information system receives the output and displays the output as described above. Thus, the occupants in the vehicle optionally use the controls that are present in the vehicle to interact with software applications that are executed on the phone, but do not have to use input devices that are integrated with the phone or view output using the display devices on the phone.

In another configuration, the in-vehicle information system identifies sensor data to be sent to the mobile phone (block 140). For example, some in-vehicle information systems receive data from in-vehicle sensors such as fuel level sensors, oil pressure sensors, engine temperature sensors, tire pressure sensors, navigation devices, and the like (block 160). The in-vehicle information system arranges some or all of the sensor data in a format that is compatible with software applications in the mobile phone and sends the sensor data to the mobile phone (blocks 144 and 156). The software application in the mobile phone receives the sensor data (block 148), and the application in the mobile phone generates new output based on the sensor data (block 152). The new output from the mobile phone is then sent to the display devices in the in-vehicle information system for output, as described above with reference to block 108.

While the in-vehicle information system is configured to collect a range of sensor data, in some configurations only a portion of the sensor data are sent to the mobile phone. For example, in one embodiment the in-vehicle information only sends sensor information to particular software applications that perform an authentication and authorization process with the in-vehicle information system. In one embodiment, the in-vehicle information system and the mobile phone perform the authentication and authorization process using cryptographic certificates.

The in-vehicle information system then sends the granted sensor data to the phone. Depending on the type of sensor information, the data is compressed and encrypted. For example, video streams from car cameras need to be compressed in order to reduce the data volume and to reduce the bandwidth required for transmission.

The phone receives the sensor data and then forwards it to the computing application that requested the sensor information. The in-vehicle information system ensures this application is available and still running on the mobile phone. If the application or component is not running anymore on the phone the in-vehicle information system tries to restart it. If this fails, the in-vehicle information system informs the driver information system which in turn reverts back to using a built-in functionality, such as rendering a simpler map.

Figure 3:
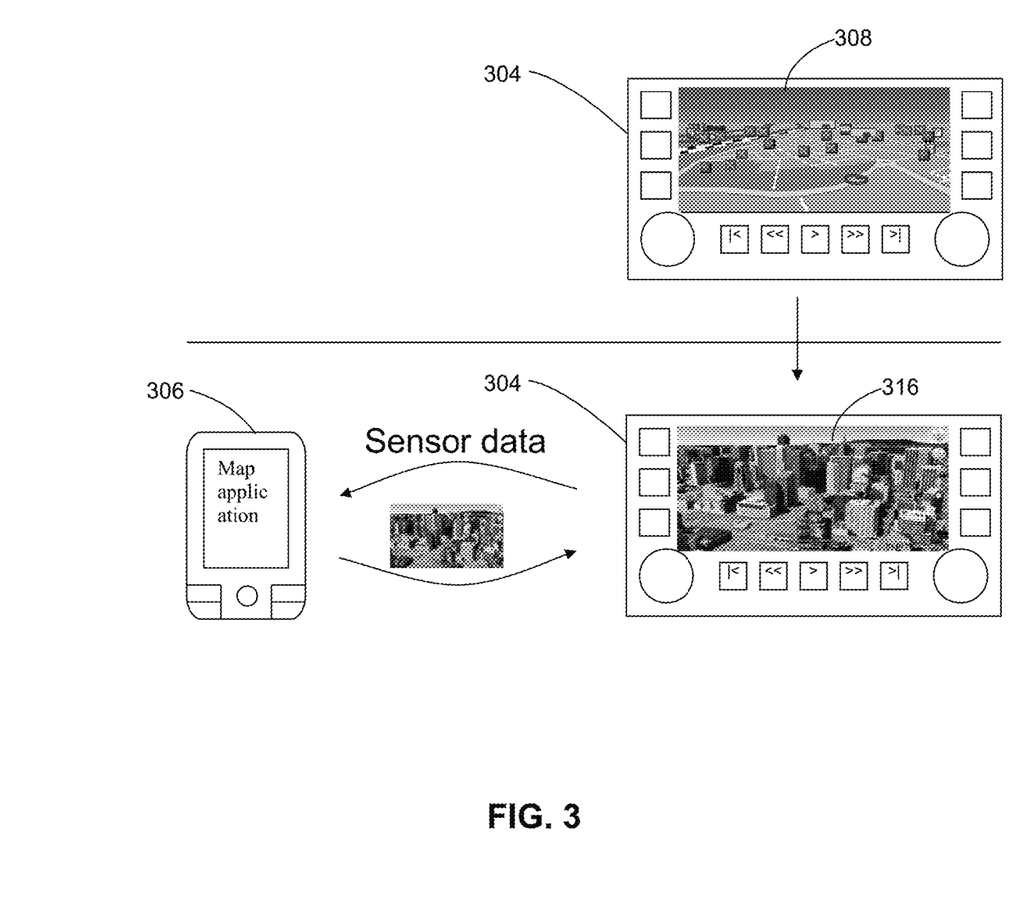
FIG. 3 is a diagram of a visual display that is generated in a display device in an in-vehicle information system from display output data that are generated with a smartphone that is operatively connected to the in-vehicle information system.

FIG. 3 depicts an LCD display 304 in an in-vehicle information system that sends sensor data to a mobile electronic device, which is embodied as a mobile phone 306, and receives output from the mobile phone corresponding to the sensor data. The in-vehicle information system includes a GPS receiver or other navigation device and a mapping software application that displays a simple map view 308 of a location around the vehicle. The in-vehicle information system sends either or both of the geographic coordinates of the vehicle and the in-vehicle map to the mobile phone 306. The mobile phone 306 includes a mapping application program that retrieves an aerial photographic view of the map display 308 from, for example, an online mapping service that the mobile phone 306 accesses through a wireless data network. The mobile phone 306 outputs the photographic view to the LCD panel 304, which generates a photographic display 316. In some embodiments, the mobile phone 306 streams a series of graphics frames that include photographic views of the region around the vehicle or video of the screen output from the mobile phone 306 as the vehicle moves.

In the configuration of FIG. 3, the mobile phone 306 is operatively connected to the LCD display 304 through a network device. As used herein, the term "network device" is used broadly to include wired or wireless data network devices that transmit data using network protocols including, but not limited to, the IP, TCP/IP, UDP/IP, and other higher-level data transmission protocols. The network devices further include point-to-point and shared-bus communication interfaces include wired and wireless USB and any other suitable input/output device that enables bidirectional communication between the mobile phone 306 and the in-vehicle information system.

As described above, the mobile electronic device transmits data corresponding to output to the in-vehicle information system. In some embodiments, the communication channel between the mobile electronic device and the in-vehicle information system provides a comparatively low bandwidth. Additionally, the interior of the vehicle can be exposed to electrical noise and other interference that reduces the reliability of the communication channel between the mobile electronic device and the in-vehicle information system. In a configuration where the mobile electronic device sends a video output stream to the in-vehicle information system, the limitations of the communication channel can degrade the quality of the video or prevent the video from being displayed in a manner that the occupants of the vehicle perceive as a smooth video of a series of graphics frames instead of a series of individual images formed in individual graphics frames.

The in-vehicle information system and the mobile electronic device perform multiple optimizations using both hardware and software components to improve the transfer of video from the mobile electronic device to the in-vehicle information system. For example, in some embodiments either or both of the mobile electronic device to the in-vehicle information system include hardware acceleration units that are specifically configured to encode and decode video data. The encoding process typically compresses the video data, which reduces the bandwidth requirement through the communication channel to transfer video data at an acceptable rate. Additionally, while many video standards encode information as a series of graphics frames at a rate of 25 frames per second (FPS) for smooth playback, many applications do not require the full 25 FPS playback speed. For example, an in-vehicle navigation application presents a map that is updated only one time every several seconds as the vehicle drives. In this configuration, the mobile electronic device only encodes and sends image data at rate of one frame every several seconds to reduce the bandwidth requirements of the communication channel. Additionally, encoding video at a reduced frame rate reduces the power consumption and correspondingly increases the effective battery life of the mobile electronic device.

Additional optimizations include adjustments to the quality of images in the video to adapt to the available bandwidth and loss rate of the communication channel. The picture quality/compression rate directly influences the amount of time needed to encode the contents and the size of data to be transferred. By acknowledging the need of high or low picture quality, the system is able to influence these factors. If there is not enough computational power or bandwidth available or if the frame rates drops to a value below a defined threshold, the picture quality might be automatically reduces by the system to increase the frame rate and correspond to a predetermined frame rate for smooth video playback.

Another optimization includes dynamic adjustment of the frame rate and optional skipping of graphics frames to enable video playback at a predetermined frame rate. For example, human eyes recognize frame rates of around 25 frames per second as fluent motion, therefore frame rates above 25 fps often provide only marginal improvements to the perceived quality of the video. On the other hand, frame rates below 25 FPS are often noticeably choppy and most users can identify that the video is not fluid. When the current frame rate is above 25 fps or another predetermined threshold, then the mobile electronic device is configured to, skip frames to reduce CPU load/battery usage by reducing the number of frames that are encoded and transmitted or improve the picture quality by adding additional data into each frame while maintaining the predetermined frame rate. If the frame rates drops below the predetermined frame rate threshold, then the mobile electronic device downgrades picture quality to reduce time for encoding and data size that are transferred through the communication channel, or switches from software to hardware encoding to take advantage of additional computational power in a hardware based encoding device.

Figure 4:
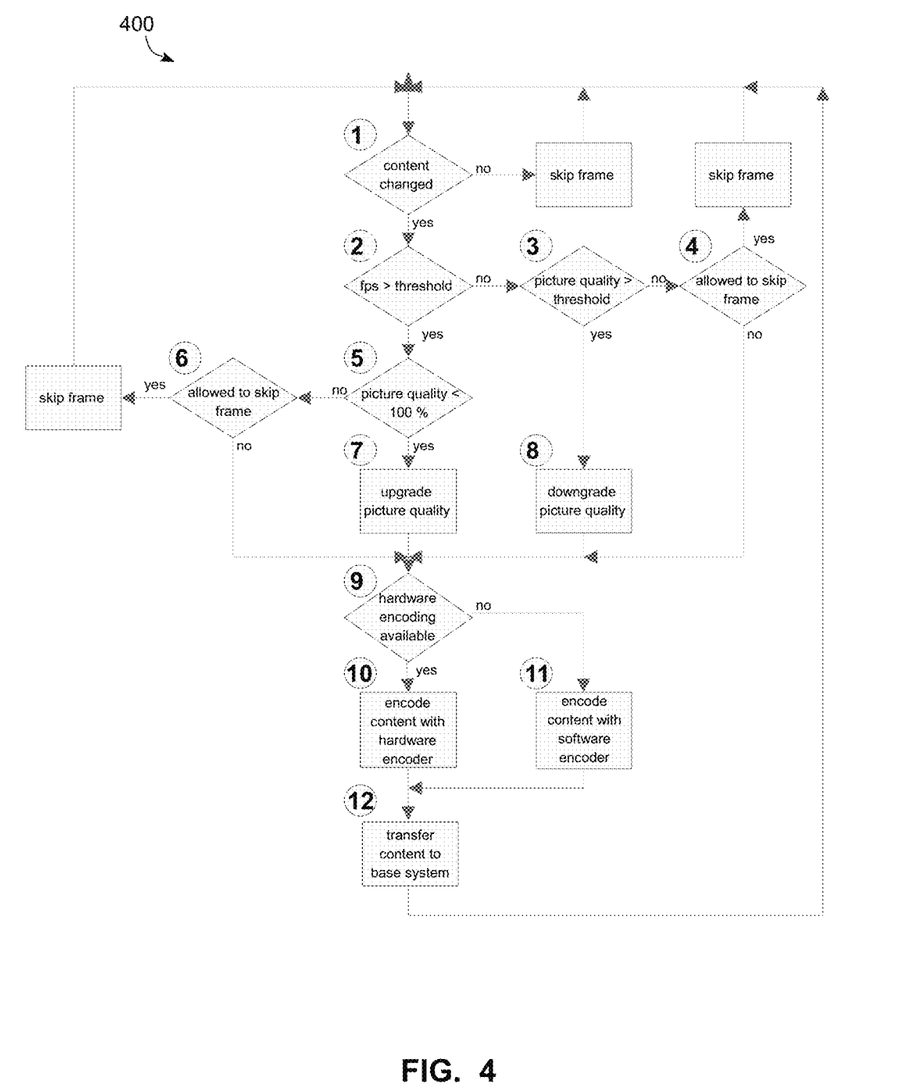
FIG. 4 is a block diagram of a process for sending video data from a mobile electronic device to an in-vehicle information system in an efficient manner.

FIG. 4 depicts a process 400 for controlling a transfer of video data between the mobile electronic device and the in-vehicle information system to enable display of video using the communication channel that provides low bandwidth and/or high noise. In one embodiment, a mobile electronic device in the vehicle performs process 400 using one or more processors and optional video encoding devices. The mobile electronic device optionally receives feedback data from the in-vehicle information system that indicate the effective playback rate of the video and the quality of the video.

In block 1, the mobile electronic device analyzes the content of the video stream since a previous frame in the video was sent. The mobile electronic device generates the video as a series of individual graphics frames that the mobile electronic device encodes and transmits to the in-vehicle information system. If the content did not change, the mobile electronic device does not encode and transfer the current content to the base system, and instead skips the next frame. In one embodiment, the mobile electronic device generates a checksum or hash of the pixel contents in both frames of graphics data to identify if the contents are the same or different between the two frames. To skip a frame, the processor in the mobile electronic device refrains from transmitting the second frame and optionally refrains from encoding the second frame prior to transmission. The processor waits until another frame of graphics data is generated that differs from the contents of the first frame and second frame before transmitting another frame.

In block 2, the mobile electronic device identifies if the frame rate of the video stream is above the predetermined threshold rate, such as a threshold rate of 25 FPS. If the frame rate is above the predetermined threshold, then the mobile electronic device optionally increases the number of bits that are included in subsequent graphics frames to lower the frame rate to the predetermined frame rate while improving the quality of the image in each of the subsequent frames. In another configuration, the mobile electronic device skips some of the subsequent frames to reduce the frame rate to the predetermined level.

In block 3, the mobile electronic device identifies if the picture quality for each frame is above a predetermined quality threshold. If the picture quality is above the defined minimum threshold, then the picture quality of subsequent graphics frames may be downgraded to reduce the bandwidth usage over the communication channel or to increase the frame rate of subsequently transmitted frames. In block 8, the picture quality for subsequent graphics frames is downgraded when the picture quality of the frame exceeds a predetermined quality threshold. To downgrade the quality, the encoder uses a smaller number of bits to generate the encoded output frame, which typically reduces the perceptible quality of the encoded frame. In some embodiments, the encoder applies a higher level of compression to reduce the number of bits used to encode a graphics frame at a lower quality level, and applies a lower level of compression to increase the number of bits to encode a graphics frame at a higher quality level. The processor identifies the quality level of previously transmitted graphics frames either from directly identifying the sizes of the previously encoded graphics frames or indirectly from the compression level setting of the encoder.

In block 4, the mobile electronic device identifies if frame skipping is enabled. The frame skipping is activated to skip a portion of the subsequent graphics frames in the sequence in response to the picture quality of the video, which is identified in block 3, being below the predetermined quality threshold. In some embodiments, the mobile electronic device is configured to send frames of graphics data at a maximum rate that is encoded in the video data, while in another embodiment the mobile electronic device skips some graphics frames if the video data are being transmitted at a rate that is greater than the predetermined threshold rate. For example, if the predetermined threshold rate is 25 FPS, but the graphics data are encoded at 30 FPS, then the mobile electronic device selectively skips the transmission and optionally the encoding of subsequent frames at regular intervals to deliver the video at the reduced rate of 25 FPS.

In blocks 5 and 7, the mobile electronic device identifies if the picture quality of each frame can be improved in situations where the frame rate is above the predetermined threshold rate in block 2. In some configurations, the picture quality of each frame of video data is degraded to maintain the predetermined frame rate. If the frame rate is sufficiently high, then the mobile electronic device can include additional bits of data in each frame to improve the picture quality. In block 6, if frame skipping is enabled, then the mobile electronic device optionally skips some subsequent graphics frames if the frame rate is at or above the predetermined threshold frame rate. The mobile electronic device optionally skips transmission of frames in the processing described by block 6 in situations where the mobile electronic device is able to transmit the graphics frames at a predetermined maximum rate (e.g. 60, 30, or 25 FPS in different embodiments) and when the encoded graphics quality is already at a maximum predetermined quality level.

In block 9, the mobile electronic device identifies if dedicated hardware is available for encoding the frame of video data. In block 10, the mobile electronic device uses the dedicated video encoding hardware to encode the graphics frame, and in block 11 the mobile electronic device uses a general purpose processing device, such as a central processing unit (CPU) to encode the frame using a software algorithm if dedicated encoding hardware is not available.

In block 12, the mobile electronic device transfers the encoded graphics frame to the in-vehicle information system. In one embodiment, the head unit in the vehicle includes a wireless transceiver that receives a wireless data transmission from the mobile electronic device. The wireless transmission includes the video data, and a video decoder in the in-vehicle information system decodes the video data and displays the video data using an LCD display or other suitable display device.

Process 400 continues during the transmission of video while the mobile electronic device executes a program. In the embodiment of the in-vehicle information systems in FIG. 2 and FIG. 3, the mobile electronic device executes a software program that uses data received from the in-vehicle information system. As depicted in FIG. 3, the mobile phone 306 receives sensor data from the in-vehicle information system and executes a program, such as the mapping program depicted in FIG. 3. The mobile phone 306 generates graphical output for the program to an off-screen frame buffer that does not display graphics directly on the screen of the mobile phone 306. Instead, the off-screen frame buffer is configured with a graphical resolution that corresponds to the graphical display device 304 in the in-vehicle information system. For example, in one embodiment a mobile electronic device has a display resolution of 2560×1600 pixels, but the in-vehicle display device has a resolution of 1920×1080 pixels. The mobile electronic device generates the off-screen frame buffer at the 1920×1080 pixel resolution of the in-vehicle display 304, and renders graphics to the off-screen frame buffer. As is known in the art, the off-screen frame buffer is formed in a memory in the mobile phone 306. In some embodiments, the mobile phone 306 includes memory devices that are devoted to storing graphics data that hold the off-screen frame buffer.

While rendering the graphics, the mobile phone 306 performs the process 400 to transmit the contents of the off-screen frame buffer to the in-vehicle information system for display using the in-vehicle display device 304. As described above, the mobile phone 306 modifies the quality and rate of transmitted frames to maintain an acceptable frame rate for the display of animated graphics through the in-vehicle information system. The mobile phone 306 also receives input data either directly through built-in input devices, such as a touchscreen or voice input device, or the mobile electronic devices receive input indirectly when the user operates input devices in the in-vehicle information system. The mobile phone generates new output based on the input to enable a vehicle operator to control the software that is executed by the processor in the mobile phone 306 using control devices that are incorporated into the in-vehicle information system.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the embodiments described herein and in the following claims.

What is claimed:

1. A system for display of graphics comprising:
an in-vehicle information system comprising:
a first display device;
a first network interface device; and
a first processor operatively connected to the first display device and the network interface device, the first processor being configured to:
receive encoded graphics data corresponding to a series of graphics frames generated by a mobile electronic device through the first network interface device; and
decode the encoded graphics data to generate a display of the graphics frames using the first display device; and
the mobile electronic device comprising:
a second network interface device;
a memory; and
a second processor operatively connected to the second network interface device and the memory, the second processor being configured to:
execute program instructions to generate a series of graphics frames that are generated at a first frame rate and stored in an off-screen frame buffer in the memory;
generate encoded data corresponding to the series of graphics frames; and
transmit the encoded data to the in-vehicle information system using the second network interface, the second processor being further configured to:
identify a rate of transmission for the encoded graphics frames to the in-vehicle information system;
identify a picture quality of the encoded graphics frames, the picture quality corresponding to a number of data bits used to encode each graphics frame; and
refrain from transmitting at least one subsequent graphics frame to maintain a predetermined maximum rate of frame transmission in response to the rate of transmission being above the predetermined maximum rate of frame transmission and the picture quality being at a maximum predetermined quality.

2. The system of claim 1, the second processor being further configured to:
identify first content in a first frame in the sequence of graphics frames;
identify second content in a second frame in the sequence of graphics frames, the second frame being generated immediately after the first frame; and
refrain from transmitting encoded data corresponding to the second frame in response to the first content being the same as the second content.

3. The system of claim 2, the second processor being further configured to:
refrain from encoding the second frame in response to the first content being the same as the second content.

4. The system of claim 1, the second processor being further configured to:
generate encoded data for subsequent graphics frames to reduce a number of data bits in each subsequent graphics frame in response to the rate of transmission being less than a predetermined threshold.

5. The system of claim 1, the second processor being further configured to:
generate encoded data for subsequent graphics frames to increase a number of data bits in each subsequent graphics frame in response to the rate of transmission being greater than a predetermined threshold.

6. The system of claim 1, the second processor being further configured to:
generate encoded data for subsequent graphics frames to reduce a number of data bits in each subsequent graphics frame in response to the rate of transmission being less than a predetermined threshold and the picture quality being above another predetermined threshold.

7. The system of claim 6, the second processor being further configured to:
refrain from transmitting at least one subsequent graphics frame in response to the rate of transmission being less than the predetermined threshold and the picture quality being below the other predetermined threshold.

8. The system of claim 1, further comprising:
a second display device in the mobile electronic device; and
the second processor in the mobile electronic device being operatively connected to the second display device and further configured to:
generate the encoded corresponding to the series of graphics frames in the off-screen frame buffer at a first display resolution that corresponds to a display resolution of the first display in the in-vehicle information system;
generate another graphical output for display with the second display device in the mobile electronic device at a second resolution of the second display, the second resolution being different than the first resolution and the other graphical output including another series of graphics frames that are different than the series of graphics frames generated for the off-screen frame buffer.

9. The system of claim 1, the mobile electronic device further comprising:
a hardware acceleration unit operatively connected to the second processor and configured to generate the encoded data corresponding to the series of graphics frames.

* * * * *